United States Patent
Kim et al.

(10) Patent No.: US 9,245,454 B2
(45) Date of Patent: Jan. 26, 2016

(54) ROTARY ACTUATOR AND METHOD OF PROVIDING KINESTHESIA USING A MAGNETORHEOLOGICAL FLUID

(71) Applicant: Yeonhab Precision Co., Ltd., Cheonan-si, Chungcheongnam-do (KR)

(72) Inventors: Bonggu Kim, Cheonan-si (KR); Soungbo Sim, Asan-si (KR); Youngho Jeong, Cheonan-si (KR); Sang-Youn Kim, Seoul (KR); In Ho Yun, Pyeongtaek-si (KR)

(73) Assignee: Yeonhab Precision Co., Ltd., Cheonan-si (KR)

( * ) Notice: Subject to any disclaimer, the term of this patent is extended or adjusted under 35 U.S.C. 154(b) by 71 days.

(21) Appl. No.: 14/322,463

(22) Filed: Jul. 2, 2014

(65) Prior Publication Data

US 2015/0011918 A1    Jan. 8, 2015

(30) Foreign Application Priority Data

Jul. 4, 2013   (KR) .................. 10-2013-0078178

(51) Int. Cl.
| | |
|---|---|
| *H04B 3/36* | (2006.01) |
| *G09B 9/28* | (2006.01) |
| *F16D 57/00* | (2006.01) |
| *A63F 13/285* | (2014.01) |

(52) U.S. Cl.
CPC ............ *G09B 9/28* (2013.01); *A63B 21/00845* (2015.10); *F16D 57/002* (2013.01); *A63F 13/285* (2014.09)

(58) Field of Classification Search
CPC ... F16D 57/002; A63B 21/00845; G09B 9/28
USPC ....................................................... 340/407.1
See application file for complete search history.

(56) References Cited

U.S. PATENT DOCUMENTS

| | | | | |
|---|---|---|---|---|
| 2,673,631 A | * | 3/1954 | Gold ................. | F16D 37/02 192/21.5 |
| 5,573,088 A | * | 11/1996 | Daniels ............. | B60G 17/0157 188/267 |
| 6,378,558 B1 | * | 4/2002 | Pohl ................. | F16F 9/34 137/807 |

(Continued)

FOREIGN PATENT DOCUMENTS

| | | |
|---|---|---|
| KR | 10-2001-0102640 A | 11/2001 |
| KR | 10-2001-0057470 A | 3/2003 |
| KR | 10-2007-0132361 A | 6/2009 |

*Primary Examiner* — Hai Phan
*Assistant Examiner* — Royit Yu
(74) *Attorney, Agent, or Firm* — Jefferson IP Law, LLP (57) ABSTRACT

A rotary actuator and a method of providing kinesthesia using a magnetorheological fluid are provided. The method includes generating a solenoid which generates a magnetic field, thereby forming flux lines, in response to a current being applied thereto. A cylindrical rotor surrounds inner, outer and top surfaces of the solenoid, is freely rotatable about a rotary shaft disposed in an opened central portion thereof. A cylindrical housing surrounds inner, outer and bottom surfaces of the solenoid, and engages with the rotor. The magnetorheological fluid is disposed inside gaps among the solenoid, the rotor and the housing, and generates magnetic chains along the flux lines in response to the magnetic field. The thickness of walls of the rotor which surround the inner and outer surfaces of the solenoid decreases in the top-to-bottom direction. A space having a predetermined width is defined around the rotary shaft.

6 Claims, 7 Drawing Sheets
(3 of 7 Drawing Sheet(s) Filed in Color)

(56) References Cited

U.S. PATENT DOCUMENTS

| | | | | |
|---|---|---|---|---|
| 8,424,656 B2* | 4/2013 | Hiemenz | ............... | F16F 9/3415 188/267.2 |
| 2004/0074718 A1* | 4/2004 | Takeda | ................... | F16D 63/00 188/267 |
| 2008/0000744 A1* | 1/2008 | Yasumoto | ............. | F16D 37/008 192/3.23 |
| 2008/0097269 A1* | 4/2008 | Weinberg | .................. | A61F 2/68 602/16 |
| 2008/0150458 A1* | 6/2008 | Ryynanen | ............... | F16F 15/03 318/362 |
| 2009/0266670 A1* | 10/2009 | McDaniel | ............... | F16D 37/02 192/12 R |
| 2013/0175132 A1* | 7/2013 | Battlogg | ................ | F16D 37/02 192/21.5 |

* cited by examiner

ROTARY ACTUATOR AND METHOD OF PROVIDING KINESTHESIA USING A MAGNETORHEOLOGICAL FLUID

CROSS-REFERENCE TO RELATED APPLICATION(S)

This application claims the benefit under 35 U.S.C. §119(a) of a Korean patent application filed on Jul. 4, 2013 in the Korean Intellectual Property Office and assigned Serial number 10-2013-0078178, the entire disclosure of which is hereby incorporated by reference.

TECHNICAL FIELD

The present disclosure relates to an actuator. More particularly, the present disclosure relates to a rotary actuator and a method of providing kinesthesia using a magnetorheological fluid.

BACKGROUND

An actuator is a type of motor that is responsible for moving or controlling a mechanism or system, and extensively includes various types of motors that using electricity, hydraulic power, compressed air, or the like. Typically, an actuator is operated by a source of energy such as an electric current, hydraulic fluid pressure or pneumatic pressure; and converts that energy into motion. Recently, many actuators, which are provided on the physical body of a user to provide kinesthesia, are being developed. Most actuators that have been developed to date use a vibration motor or either a hydraulic or pneumatic pump to provide kinesthesia to the human body (see Korean Patent Application Nos. 10-2001-0057470 and 10-2007-0132361). Specifically, either a plurality of vibration motors known in the art is equipped within clothes or air is blown into pneumatic windbags in order to apply pressure to the skin.

However, these actuators of the related art which are intended to provide kinesthesia have the following problems. These actuators suffer from limitations in use and space owing to their bulky volume and heavy weight, and their applications are limited to specific and restricted fields. In particular, the use of miniaturized and light-weight actuators is required in order to provide kinesthetic haptic feedback to fingers or the like on which the actuators are disposed. It is required to develop a single module actuator that consumes little power, is small-sized and slim, and is applicable to a variety of environments.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a rotary actuator and a method of providing kinesthesia using a magnetorheological fluid. In the rotary actuator, a solenoid, a rotor, a housing and the magnetorheological fluid are combined into a novel structure in order to provide kinesthetic feedback, such that high resistance may be produced using little power. Accordingly, the rotary actuator may be easily assembled and attached to and detached from other mechanisms or tools since it is lightweight and miniaturized, and therefore may be applied to a variety of environments.

In accordance with an aspect of the present disclosure, a rotary actuator is provided. The rotary actuator includes a solenoid which generates a magnetic field, thereby forming flux lines, in response to a current being applied thereto, a cylindrical rotor which surrounds inner, outer and top surfaces of the solenoid, the rotor having a rotary shaft disposed in an opened central portion of the solenoid, and being freely rotatable about the rotary shaft, a cylindrical housing which surrounds inner, outer and bottom surfaces of the solenoid, the housing being configured such that the housing engages with the rotor, and a magnetorheological fluid which is injected into the housing and disposed inside gaps among the solenoid, the rotor and the housing, the magnetorheological fluid generating magnetic chains along the flux lines in response to the magnetic field being generated.

It is preferred that the cross-section of the rotor be configured such that the thickness of walls of the rotor which surround the inner and outer surfaces of the solenoid decreases in the top-to-bottom direction, and that a space having a predetermined width be defined around the rotary shaft, whereby the rotor engages with the housing which has a corresponding configuration.

It is preferred that the cross-section of the housing be configured such that the thickness of walls of the housing which surround the inner and outer surfaces of the solenoid decreases in the bottom-to-top direction, and that the inner wall having a preset thickness surround the rotary shaft, whereby the housing engages with the space of the rotor having the predetermined width which surrounds the rotary shaft.

It is preferred that the rotary actuator further include a cover which is disposed over the rotor and is coupled with a top end of the housing.

It is preferred that the rotary actuator be applied as a haptic actuator which is disposed on a joint of a human body to provide kinesthetic feedback.

In accordance with another aspect of the present disclosure, a method of providing kinesthesia by a rotary actuator is provided. The rotary actuator includes a solenoid, a cylindrical rotor which surrounds inner, outer and top surfaces of the solenoid, the rotor having a rotary shaft disposed in an opened central portion of the solenoid, and being freely rotatable about the rotary shaft, a cylindrical housing which surrounds inner, outer and bottom surfaces of the solenoid, the housing being configured such that the housing engages with the rotor, and a magnetorheological fluid which is injected into the housing and disposed inside gaps among the solenoid, the rotor and the housing. The method includes the following operations of (1) generating, at the solenoid, a magnetic field, thereby forming flux lines, in response to a current being applied thereto, (2) generating, at magnetorheological fluid, magnetic chains along the flux lines in the gaps between the housing and the rotor in response to the magnetic field, (3) applying a disconnecting force to the magnetic chains in response to the rotor rotating about the rotary shaft, and (4) generating a repulsive force resisting to the disconnecting force applied to the magnetic chains.

It is preferred that the method further include an operation (5) providing kinesthesia to a portion on which the rotary actuator is disposed by repeating the operation (3) and the operation (4).

According to the rotary actuator and the method of providing kinesthesia using a magnetorheological fluid proposed in the present disclosure, a solenoid, a rotor, a housing and the magnetorheological fluid are combined into a novel structure in order to provide kinesthetic feedback, such that high resistance may be produced using little power. Accordingly, the rotary actuator may be easily assembled and attached to and detached from other mechanisms or tools since it is lightweight and miniaturized, and therefore may be applied to a variety of environments.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected to" or "coupled to" another element, not only it may be "directly connected" or "coupled to" the other element, but also it may be "indirectly connected or coupled to" the other element via an "intervening" element. The word "comprise," and variations such as "comprises" or "comprising," will be understood to imply the inclusion of stated elements but not the exclusion of any other elements unless explicitly described to the contrary.

A magnetorheological fluid is a liquid magnet that is usually liquid and solidifies through a viscosity change when subjected to a magnetic field. This characteristic of the magnetorheological fluid allows the magnetorheological fluid to be used in a variety of power or control devices. The inventors have developed an actuator having a novel structure and a method of providing kinesthesia using a magnetorheological fluid.

Figure 1:
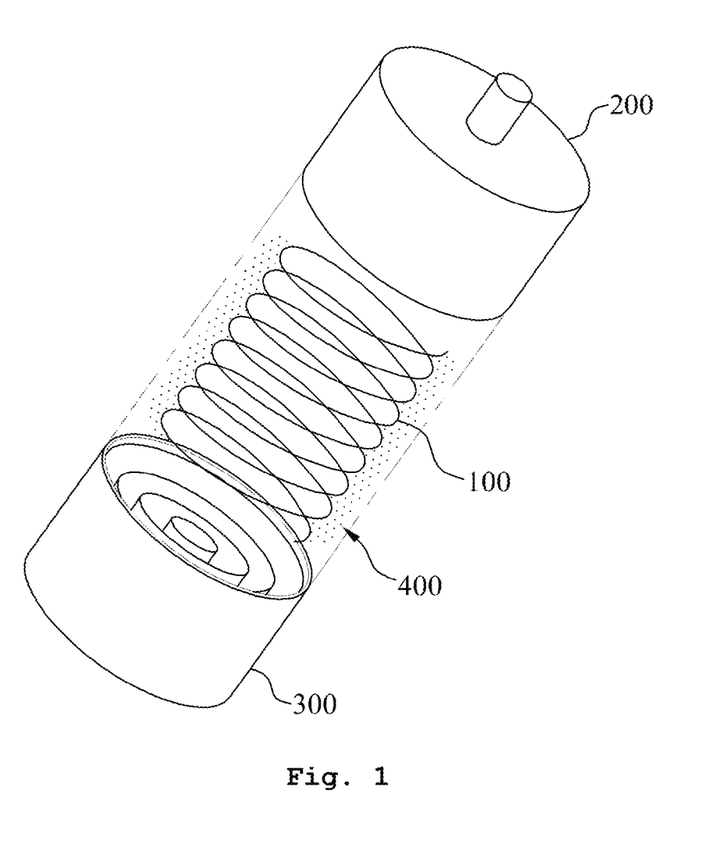
FIG. 1 is a perspective view showing the configuration of a rotary actuator using a magnetorheological fluid according to an embodiment of the disclosure.

FIG. 1 is a perspective view showing the configuration of a rotary actuator using a magnetorheological fluid according to an embodiment of the present disclosure.

Referring to FIG. 1, the rotary actuator using a magnetorheological fluid according to an embodiment of the present disclosure includes a solenoid 100, a rotor 200, a housing 300 and a magnetorheological fluid 400.

The solenoid 100 may form flux lines by generating a magnetic field in response an electric current being applied thereto. In various embodiments, the solenoid 100 may have the structure of a hollow cylinder which is produced by winding wires into the shape of cylindrical coils at small pitches. The present disclosure proposes a rotary actuator structure which is intended to provide kinesthesia by braking the rotary motion of the rotor using magnetic flux lines generated by the solenoid 100.

The rotor 200 has a cylindrical configuration which surrounds the inner surface, the outer surface and the top surface of the solenoid 100, and includes a rotary shaft 210 positioned in the hollow central portion of the solenoid 100. The rotor 200 may rotate about the center of the rotary shaft 210. When rotating about the rotary shaft 210, the rotor 200 may provide kinesthesia to a user by transferring the braking force in relation to the housing 300 and the magnetorheological fluid 400. This principle of providing kinesthesia will be described in detail later.

Figure 2:
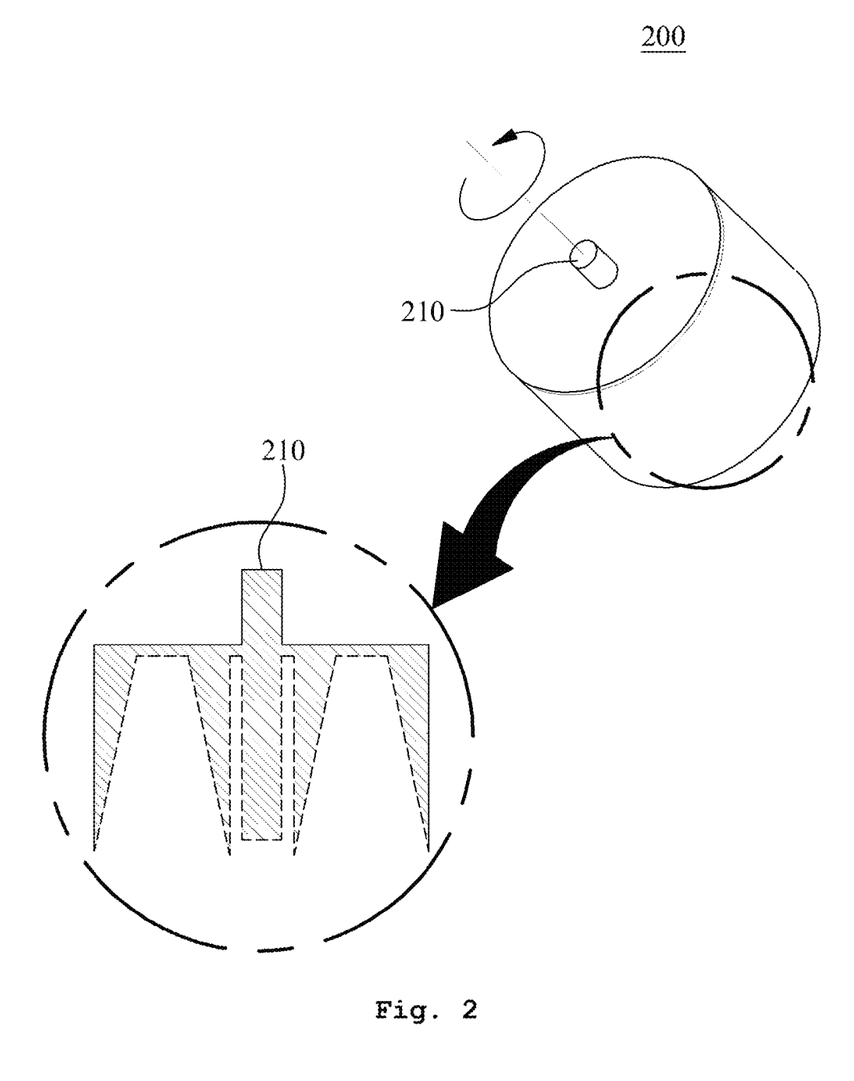
FIG. 2 is a view showing the rotor of the rotary actuator using a magnetorheological fluid according to an embodiment of the present disclosure.

FIG. 2 is a view showing the rotor of the rotary actuator using a magnetorheological fluid according to an embodiment of the present disclosure.

Referring to FIG. 2, in the rotary actuator according to an embodiment of the present disclosure, the cross-section of the rotor 200 is configured such that the thickness of walls which surround the inner and outer surfaces of the solenoid 100 decreases in the top-to-bottom direction. A space having a preset width is defined around the rotary shaft 210. With this configuration, the rotor 200 may engage with the housing 300 which has a corresponding configuration.

The housing 300 has a cylindrical configuration which surrounds the inner surface, the outer surface and the bottom surface of the solenoid 100 while surrounding the inner surface, the outer surface and the top surface of the rotor 200. The housing 300 may be configured such that it engages with the rotor 200. The housing 300 provides an outer case which houses the components of the actuator therein. The inner section of the housing 300 may contribute to the function of the actuator to provide kinesthesia through cooperation with the rotor 200 and the magnetorheological fluid 400.

Figure 3:
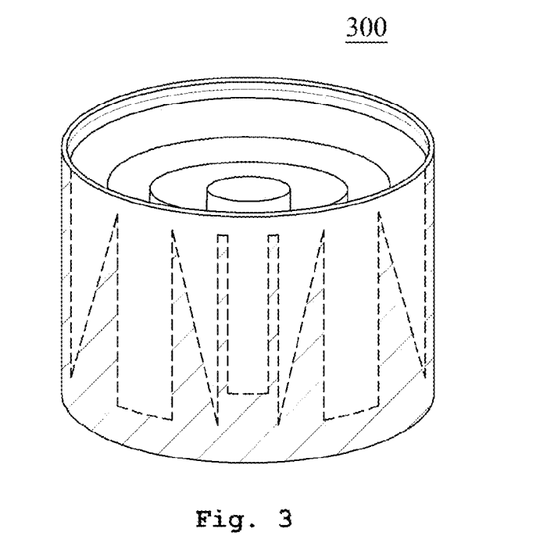
FIG. 3 is a view showing the housing of the rotary actuator using a magnetorheological fluid according to an embodiment of the present disclosure.

FIG. 3 is a view showing the housing of the rotary actuator using a magnetorheological fluid according to an embodiment of the present disclosure.

Referring to FIG. 3, in the rotary actuator according to an embodiment of the present disclosure, the cross-section of the housing 300 is configured such that the thickness of walls which surround the inner and outer surfaces of the solenoid 100 decreases in the bottom-to-top direction and the inner wall having a preset thickness surrounds the rotary shaft 210. With this configuration, the housing 300 may engage with the space of the rotor 200 having a preset width which surrounds the rotary shaft 210.

The magnetorheological fluid 400 is a functional fluid, a type of suspension in which magnetic particulates are dispersed, and the apparent viscosity of which changes in response to the structure of the dispersed particulates being changed by a magnetic field. According to the present disclosure, the magnetorheological fluid 400 is disposed in the gaps in an assembly of the solenoid 100, the rotor 200 and the housing 300. The magnetorheological fluid 400 may generate magnetic chains along magnetic flux lines when a magnetic field is applied. The magnetic chains generated in this manner may restrict the rotation of the rotor 200.

Figure 4:
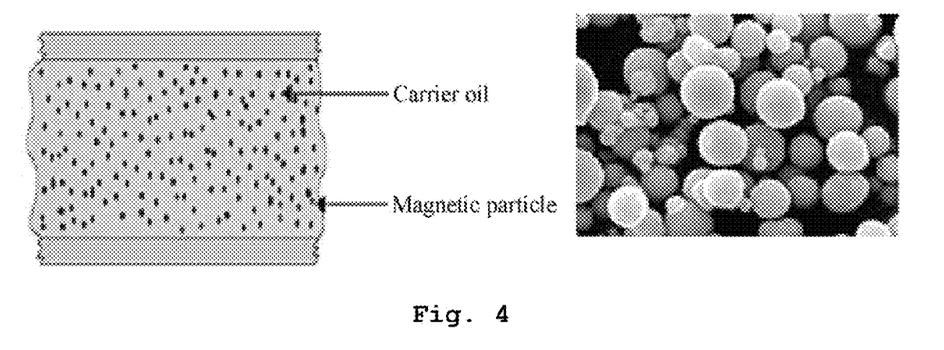
FIG. 4 is a view showing the configuration of the magnetorheological fluid in the rotary actuator using a magnetorheological fluid according to an embodiment of the present disclosure.

FIG. 4 is a view showing the configuration of the magnetorheological fluid in the rotary actuator using a magnetorheological fluid according to an embodiment of the present disclosure.

Referring to FIG. 4, the magnetorheological fluid 400 of the rotary actuator according to an embodiment of the present disclosure is a liquid magnet that is usually a type of liquid but solidifies when subjected to a magnetic field. The magnetorheological fluid may be formed by dispersing magnetic particles into a carrier fluid (a carrier oil into which the particles are to be dissolved). When the magnetorheological fluid is subjected to a magnetic field, the magnetic particles which are usually dissolved in the carrier oil are aligned along magnetic flux lines, thereby generating magnetic chains. In this case, when these magnetic chains are subjected to a disconnecting force, they resist to this force, thereby generating kinesthesia. The present disclosure proposes a structure that provides kinesthesia to a user by applying this principle to the actuator. The frequency of the generation of magnetic flux lines is proportional to the magnetic chains, and the magnetic density is proportion to the strength of the bonding of the magnetic chains.

The rotary actuator that may provide kinesthetic feedback using the magnetorheological fluid according to the present disclosure is very stable due to the characteristics of the magnetorheological fluid that acts passively, has a rapid response rate (1 ms), and exhibits high resistance while consuming little electric power. Accordingly, the rotary actuator may provide effective haptic feedback. In addition, designs having a variety of sizes and shapes are possible since the magnetorheological fluid is liquid usually. The applicable temperature ranges from −40° C. to 150° C., and it is possible to control force over a wide range.

Figure 5:
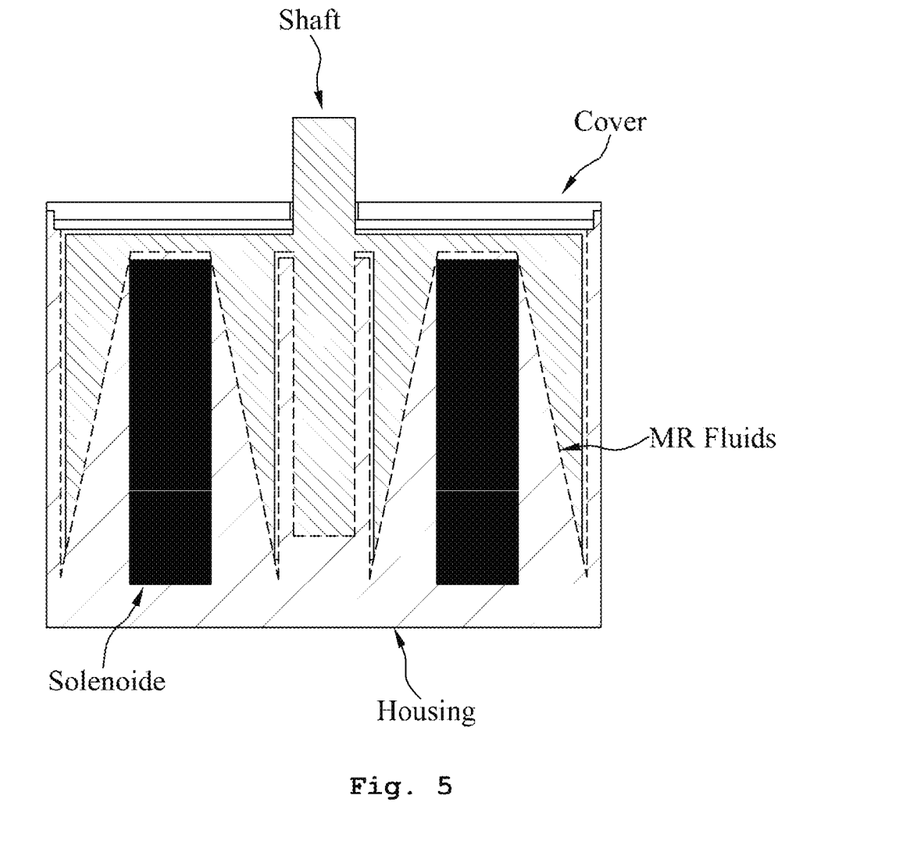
FIG. 5 is a cross-sectional view showing the rotary actuator using a magnetorheological fluid according to an embodiment of the present disclosure.

FIG. 5 is a cross-sectional view showing the rotary actuator using a magnetorheological fluid according to an embodiment of the present disclosure.

Referring to FIG. 5, the rotary actuator proposed in the present disclosure may be configured such that the walls surrounding the pipe-shaped solenoid 100 are inclined at a preset angle about the solenoid 100 and the thickness varies in the top-bottom direction. It is preferred that that the thickness of the rotor 200 surrounding the upper section of the solenoid 100 decreases in the top-to-bottom direction and the thickness of the housing 300 surrounding the lower section of the solenoid 100 increases in the top-to-bottom direction. That is, the rotor 200 and the housing 300 have mating structures since the inner portions thereof engage with each other. The rotary shaft 210 of the rotor 200 may be configured such that it is surrounded by a portion of the housing 300 having a preset thickness. In addition, the rotary actuator further includes a cover which is disposed over the rotor 200 and is coupled with the top end of the housing 300.

Figure 6:
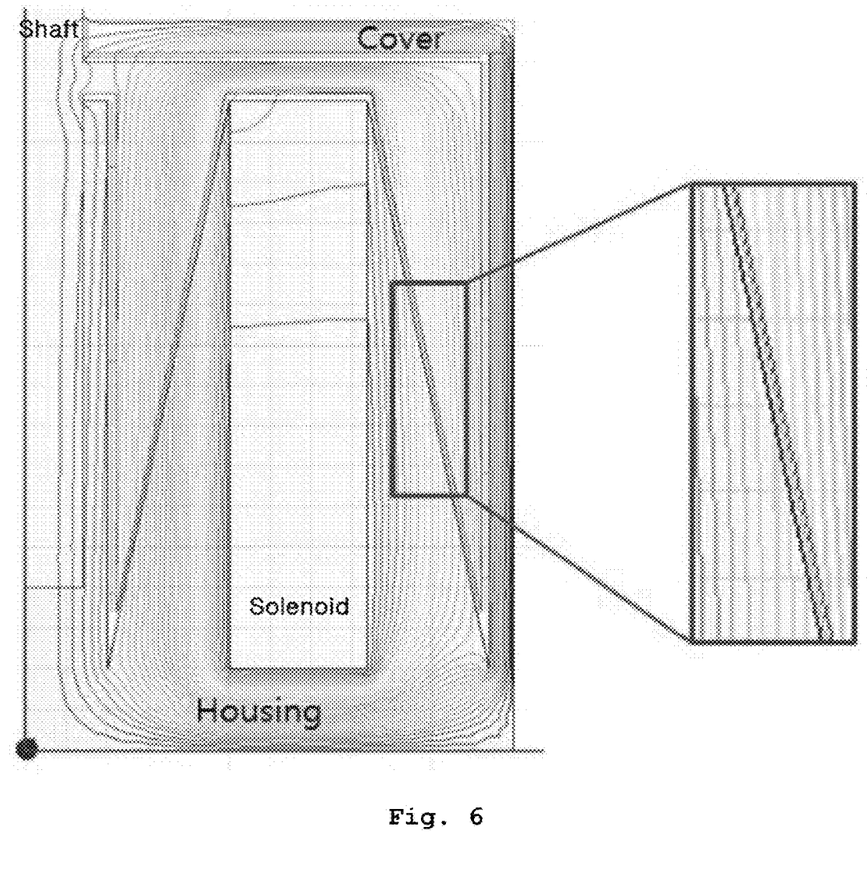
FIG. 6 is a view showing a simulation result in which magnetic flux lines and magnetic chains are formed on an RZ plane of the rotary actuator using a magnetorheological fluid according to an embodiment of the present disclosure.

FIG. 6 is a view showing the magnetic flux lines and magnetic chains of the actuator simulated on an RZ plane of the rotary actuator using a magnetorheological fluid according to an embodiment of the present disclosure.

Referring to FIG. 6, the simulation result shows that magnetic flux lines are efficiently generated between the rotor 200 and the housing 300. When the solenoid 100 generates a magnetic field, magnetic chains are formed in the gaps among the rotor 200 and the housing 300. When the rotor 200, which is the component that actually rotates, is rotated, a disconnecting force is applied to the magnetic chains, which then generate a repulsive force, thereby providing kinesthesia to the user. The magnetic chains may constantly provide kinesthesia to the user by repeatedly being disconnected and connected.

Figure 7:
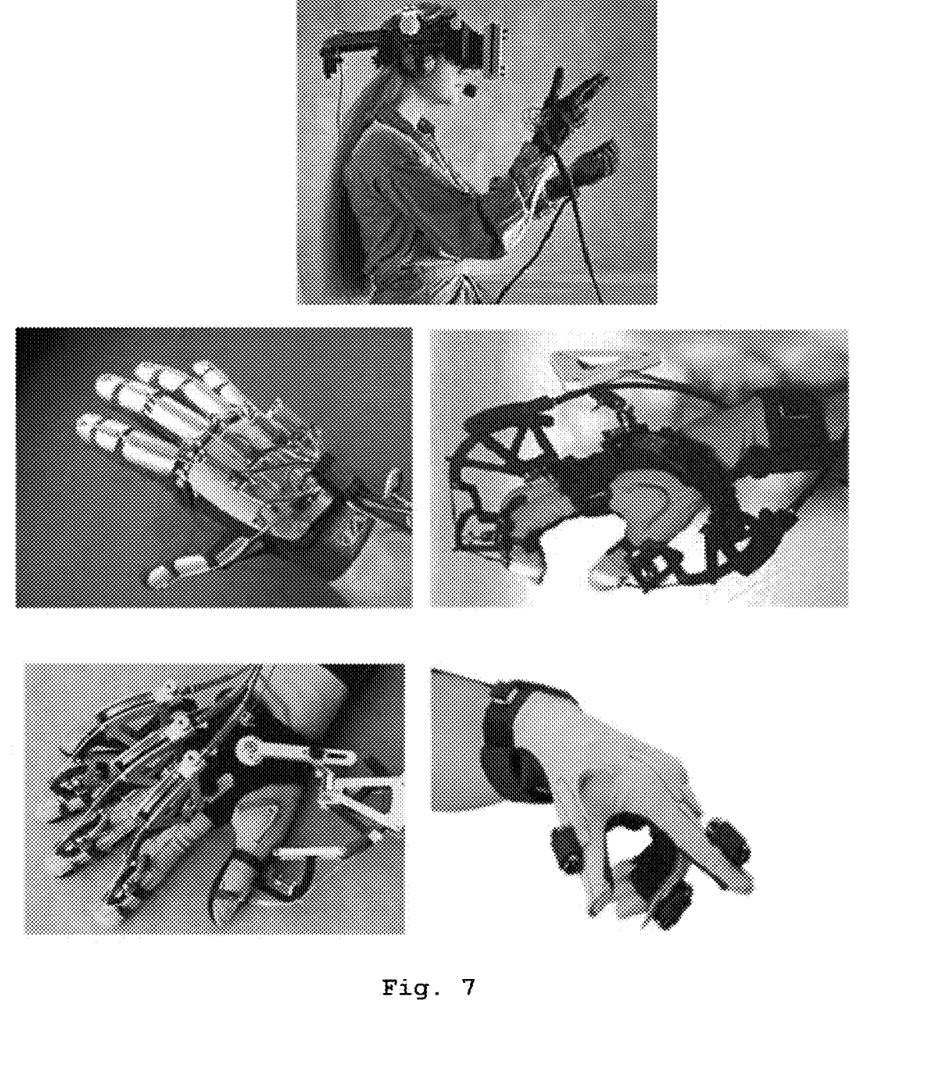
FIG. 7 is a view showing an application in which the rotary actuator using a magnetorheological fluid according to an embodiment of the present disclosure.

FIG. 7 is a view showing an application in which the rotary actuator using a magnetorheological fluid according to an embodiment of the present disclosure.

Referring to FIG. 7, the rotary actuator using a magnetorheological fluid according to an embodiment of the present disclosure may be used as a haptic actuator that is provided on a joint of a body to provide kinesthetic feedback to the user. The present disclosure relates to a small-sized and lightweight rotary actuator intended to provide kinesthesia, and uses a magnetorheological fluid according to a novel concept instead of using a conventional vibration motor, hydraulic/pneumatic motor or the like. The solenoid 100, the rotor 200, the housing 300 and the magnetorheological fluid 400 are configured into the structure which was previously shown and described with reference to FIG. 1 to FIG. 6, and which is jointed to a rotatable mechanism or tool such that the structure may break the rotation of the mechanism or tool. In this manner, the weight rotary actuator having this structure may provide kinesthesia (in particular, kinesthetic sensation to fingers of the user) when the user operates an imaginary object. Thus, the weight rotary actuator may be used as a physical apparatus that allows the user to feel the sensation of gripping as if holding an object in a hand and the sensation of an action as if pressing a button.

Figure 8:
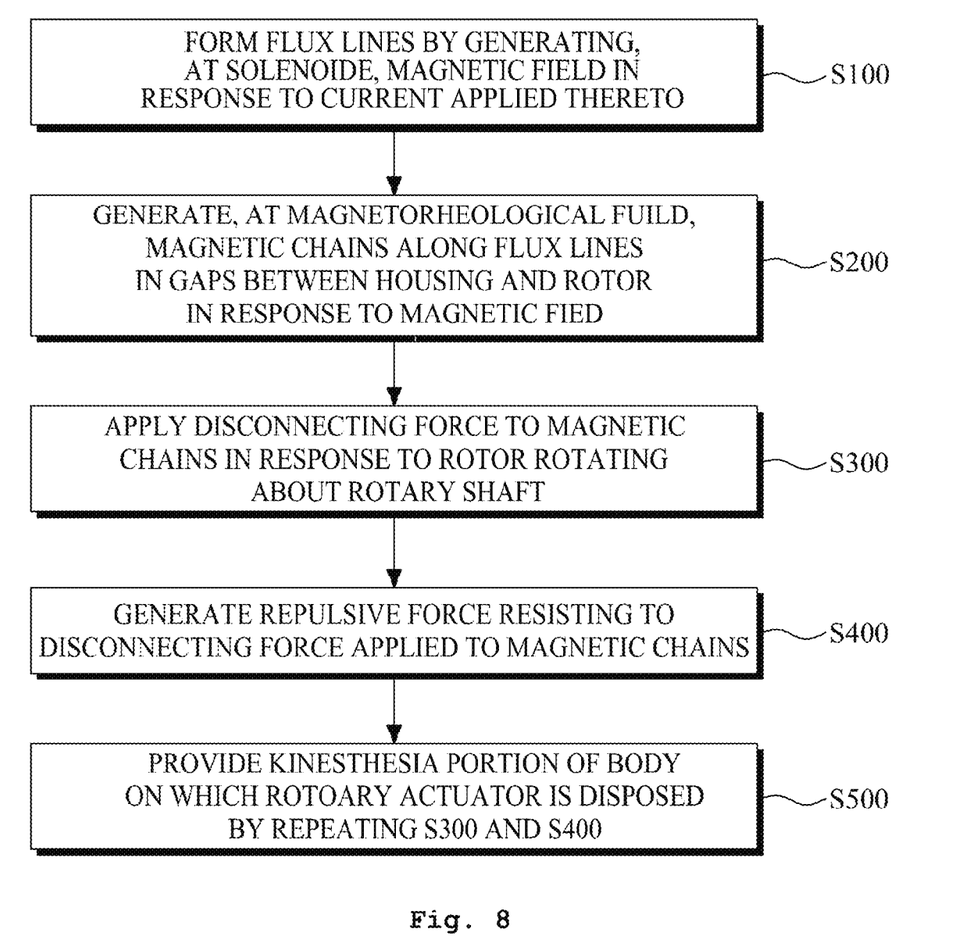
FIG. 8 is a flowchart showing a method of providing kinesthesia by means of the rotary actuator using a magnetorheological fluid according to an embodiment of the present disclosure.

FIG. 8 is a flowchart showing a method of providing kinesthesia by the rotary actuator using a magnetorheological fluid according to an embodiment of the present disclosure.

In the method of providing kinesthesia, the rotary actuator includes a solenoid, a cylindrical rotor which surrounds inner, outer and top surfaces of the solenoid, the rotor having a rotary shaft disposed in an opened central portion of the solenoid, and being freely rotatable about the rotary shaft, a cylindrical housing which surrounds inner, outer and bottom surfaces of the solenoid, the housing being configured such that the housing engages with the rotor, and a magnetorheological fluid which is injected into the housing and disposed inside gaps among the solenoid, the rotor and the housing. The method includes: operation S100 of generating, at the solenoid, a magnetic field, thereby forming flux lines, in response to a current being applied thereto; operation S200 of generating, at magnetorheological fluid, magnetic chains along the flux lines in the gaps between the housing and the rotor in response to the magnetic field; operation S300 of applying a disconnecting force to the magnetic chains in response to the rotor rotating about the rotary shaft; and operation S400 of generating a repulsive force resisting to the disconnecting force applied to the magnetic chains. The method may further include operation S500 of providing kinesthesia to a portion of a body on which the rotary actuator is disposed by repeating operation S300 and operation S400. Detailed descriptions of the respective operations will be omitted since they are identical or similar to those described above with reference to FIG. 1 to FIG. 7.

The rotary actuator using a magnetorheological fluid and the method of providing kinesthesia using the same rotary actuator according to the present disclosure uses a subminiature rotary actuator including a brake module based on a magnetorheological fluid. The rotary actuator is applicable to a variety of fields since it may be fabricated as a single module that has a small size and light weight. For example, the rotary actuator may be applied to virtual simulation systems and used for an aircraft training device in military and civil industries. The rotary actuator may also be applied to simulation systems used in special environments such as medical fields or works in extreme conditions, a variety of amusement facilities, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A rotary actuator comprising:
   a solenoid which generates a magnetic field, thereby forming flux lines, in response to a current being applied thereto;
   a cylindrical rotor which surrounds inner, outer and top surfaces of the solenoid, the rotor having a rotary shaft disposed in an opened central portion of the solenoid, and being freely rotatable about the rotary shaft;
   a cylindrical housing which surrounds inner, outer and bottom surfaces of the solenoid, the housing being configured such that the housing engages with the rotor; and
   a magnetorheological fluid which is injected into the housing and disposed inside gaps among the solenoid, the rotor and the housing, the magnetorheological fluid generating magnetic chains along the flux lines in response to the magnetic field being generated,
   wherein a cross-section of the rotor is configured such that a thickness of walls of the rotor which surround the inner and outer surfaces of the solenoid decreases in a top-to-bottom direction, and a space having a predetermined width is defined around the rotary shaft, whereby the rotor engages with the housing which has a corresponding configuration.

2. The rotary actuator according to claim 1, wherein a cross-section of the housing is configured such that a thickness of walls of the housing which surround the inner and outer surfaces of the solenoid decreases in a bottom-to-top direction, and an inner wall having a preset thickness surrounds the rotary shaft, whereby the housing engages with the space of the rotor having the predetermined width which surrounds the rotary shaft.

3. The rotary actuator according to claim 1, further comprising a cover which is disposed over the rotor and is coupled with a top end of the housing.

4. The rotary actuator according to claim 1, wherein the rotary actuator is applied as a haptic actuator which is disposed on a joint of a body to provide kinesthetic feedback.

5. A method of providing kinesthesia by a rotary actuator, wherein the rotary actuator includes a solenoid, a cylindrical rotor which surrounds inner, outer and top surfaces of the solenoid, the rotor having a rotary shaft disposed in an opened central portion of the solenoid, and being freely rotatable about the rotary shaft, a cylindrical housing which surrounds inner, outer and bottom surfaces of the solenoid, the housing being configured such that the housing engages with the rotor, and a magnetorheological fluid which is injected into the housing and disposed inside gaps among the solenoid, the rotor and the housing,
   the method comprising:
   generating, at the solenoid, a magnetic field, thereby forming flux lines, in response to a current being applied thereto;
   generating, at magnetorheological fluid, magnetic chains along the flux lines in the gaps between the housing and the rotor in response to the magnetic field;
   applying a disconnecting force to the magnetic chains in response to the rotor rotating about the rotary shaft; and
   generating a repulsive force resisting to the disconnecting force applied to the magnetic chains.

6. The method according to claim 5, further comprising:
   providing kinesthesia to a portion on which the rotary actuator is disposed by repeating the processes of applying the disconnecting force to the magnetic chains and generating the repulsive force resisting to the disconnecting force.

* * * * *